United States Patent [19]

Hartnett

[11] 4,192,560
[45] Mar. 11, 1980

[54] BEARING WITH BEARING CAGE

[75] Inventor: Michael J. Hartnett, Litchfield, Conn.

[73] Assignee: The Torrington Company, Torrington, Conn.

[21] Appl. No.: 935,350

[22] Filed: Aug. 21, 1978

[51] Int. Cl.² ............................................. F16C 33/66
[52] U.S. Cl. .................................... 308/187; 308/201; 308/217; 308/235
[58] Field of Search ............ 308/187, 201, 9, 217–218, 308/235, 184

[56] References Cited

U.S. PATENT DOCUMENTS

| | | | |
|---|---|---|---|
| 3,195,965 | 7/1965 | Van Dorn | 308/187 |
| 3,542,443 | 11/1970 | Eklund | 308/187 |
| 3,597,031 | 8/1971 | Bill | 308/187 |

*Primary Examiner*—Douglas C. Butler
*Attorney, Agent, or Firm*—Frank S. Troidl

[57] ABSTRACT

An annular cage for the rollers of a bearing is located in the annular space between two bearing races and is normally spaced from both races when concentric. The cage is so constructed that, when unbalanced forces on the cage during rotation in the bearing tend to move the cage from its concentric position into contact with a piloting surface, hydrodynamic forces are developed which act to keep the cage out of contact with that surface.

15 Claims, 14 Drawing Figures

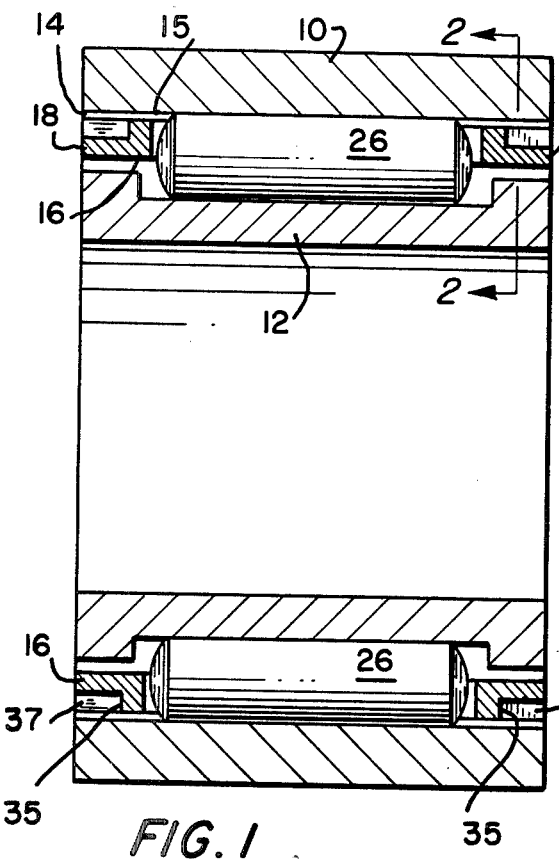
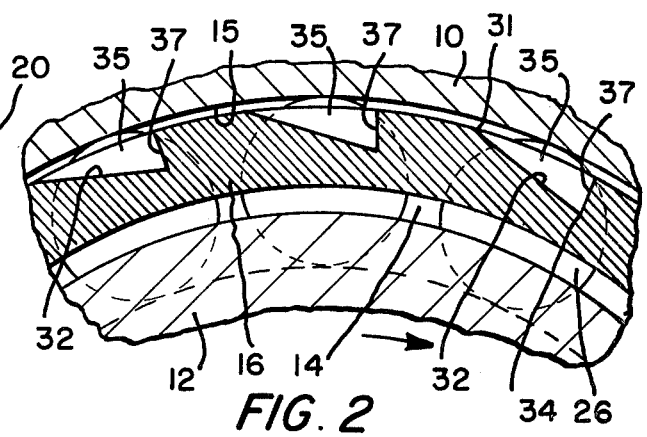
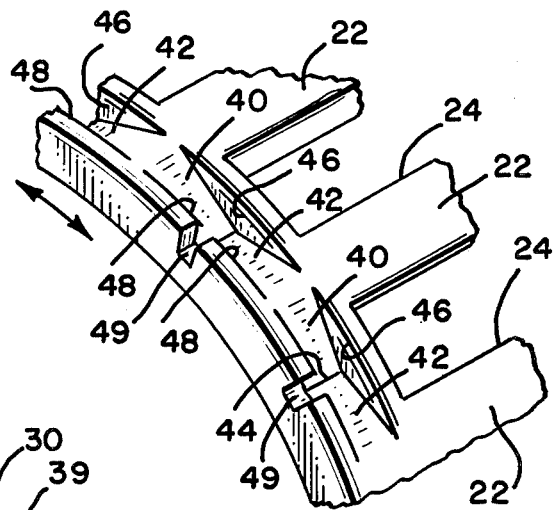
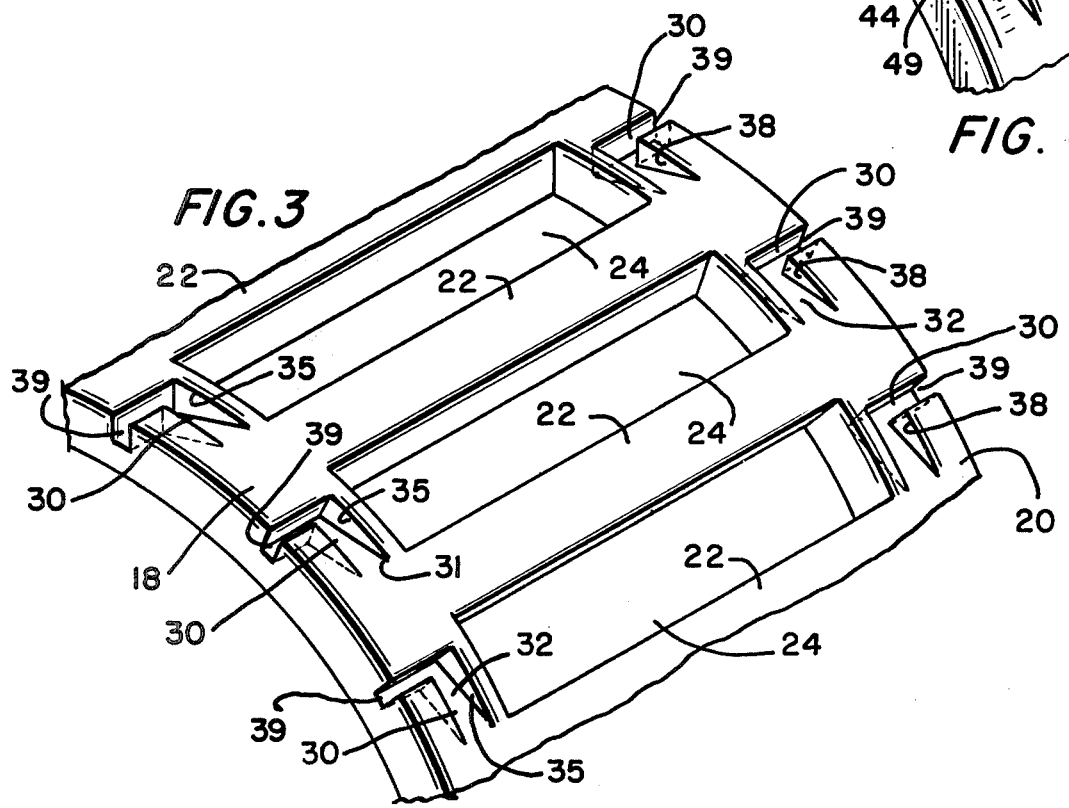
FIG. 1
FIG. 2
FIG. 4
FIG. 3

BEARING WITH BEARING CAGE

This invention relates to anti-friction bearings with rolling members separated and guided by cages. More particularly, this invention is a new bearing including a cage with provision for tending automatically to keep the cage out of forceful contact with a piloting or guiding surface by means of a hydrodynamic force developed between the cage and the piloting surface.

A cage is used in an anti-friction bearing to separate rolling elements, and in the case of a roller bearing to align the rollers. The rollers in the load zone of the bearing push against the cage bars and rotate it in the bearing as they orbit around the inner race, and the cage in turn, pushes those rollers which are not under load. In most cases, the cage is not symmetrical and it does not tend to stay concentric in the bearing. Instead, it tends to move in an eccentric path as it rotates under unbalanced forces, and therefore it must be piloted or guided to prevent too much eccentricity of motion.

Generally speaking, a radial bearing cage is radially piloted in one of three ways: Against the raceway of the outer race or against the bore of the flanges of the outer race; on the raceway of the inner race or on the radially outer peripheral surfaces of the flanges of the inner race; or on the rolling elements themselves. The cage is also axially piloted or guided or restrained by axial contact of an end of the cage against a radially extending guiding surface, or by contact with the rollers themselves. The invention is also concerned with the axial piloting of the cage by the end-surface contact.

When the cage rotates in operation and unbalanced centrifugal and other forces cause it to follow an eccentric path and contact a piloting surface on a race, high radial loads are imposed on the areas of contact of the cage and the race. Unless these contacting surfaces are well lubricated, the high radial loads result in high frictional rubbing forces between cage and guiding surface. This may be detrimental to the life of the bearing in several ways due to the generation of heat and abrasion.

The frictional heat which is developed may be detrimental to the lubricant, causing it, among other things, to degrade. As the life of the lubricant decreases, the life of the bearing itself also decreases because the lubricant's prime purpose is to maintain a lubricating film between bearing running components. If this film is no longer available, friction develops between running components, abrasion and spalling fatigue failure take place sooner than if a good lubricant film had been maintained. Bearing seals also fail faster when there is no lubricant at the seal lip.

Frictional wear which causes the temperature of the bearing running components to become excessively high may directly harm those bearing running elements. It may "temper" the hardened bearing components to a less than desirable hardness, which is detrimental to bearing life. The heat can also adversely affect the operation of the equipment in which the bearing is mounted.

Often the piloting surface is the roller path race surface itself, and the frictional rubbing may lead directly to quicker fatigue failure of those bearing surfaces which are affected and thus to decreased bearing life.

The increased retarding drag of the cage against the race caused by the increased frictional contact between cage and race results in increased driving force from roller to cage and thus directly to increased frictional rubbing between cage and roller. Abrasion of the rolling surfaces of the rollers is increased, fatigue failure of the rollers occurs sooner, and bearing life is decreased. Heat generation in this area again may contribute directly to lesser life of the lubricant and of the bearing components. The abrasion also generates tiny abrasive particles which may enter into the load area of the bearing and cause further deterioration of those bearing surfaces at a higher rate than if those particles were not in the bearing, again obviously contributing to decreased bearing life. The abrasive particles may even cause damage to the equipment in which the bearing is mounted.

Similar to the rubbing contact between the cage periphery and its guiding race surface, is the rubbing contact between the end of the cage and a radially-extending surface which limits the axial travel of the cage. When there is such rubbing contact without proper lubrication, heat and abrasion can result with the same possibility of typical damage caused by heat or by abrasive particles in the bearing or in equipment in which the bearing is mounted.

Additional penalties are imposed by excessive and variable rubbing friction between cage and guiding or piloting surfaces. In sensitive spinning instruments, the inconsistent cage drag may result in less exact operation and in a fluctuation in power required to turn the bearing and the rotating equipment which normally rotate under very low power anyway. A slight change in cage drag may cause unacceptable fluctuations in results. In all cases, excessive drag increases the power required to rotate the bearing.

Much thought is given to a method of maintaining a lubricant film between the cage surface and the piloting surface to reduce the frictional load. Unfortunately, it is seldom possible to see to it that there is always a satisfactory liquid or grease film in the rubbing contact area on these piloting surfaces. Therefore, in some cases, the cage is plated with a sacrificial low friction substance such as silver or phosphate to reduce the rubbing friction between the retainer and the piloting surface. This works well as long as the substance remains coated on the cage. However, the sacrificial lubricant layer is gradually worn away and we again have steel-to-steel contact whereupon the coefficient of friction increases dramatically, heat is generated, and abrasion takes place. This is especially true for comparatively heavy duty small bearings which labor under varying high centrifugal and inertial loads, which demand the utilization of a relatively small cage. We are not concerned here with the extremely heavy bearing cages such as found in mill roll bearings.

The new and novel bearing to be described herein is a radial bearing with a cage which is piloted on either race and the cage is maintained substantially out of forceful contact with the piloting surface of the race so that friction between the cage and the race is minimized. The invention may also be incorporated in a thrust bearing to relieve the frictional rubbing between race and cage.

Briefly described, the invention is a bearing comprising a first race, a second race spaced from the first race, and a nominally concentric annular retainer located in the annular space between races. The cage, when concentric, is normally spaced from both races and has a plurality of circumferentially spaced rolling member pockets containing rolling members. When the cage goes off center, it is piloted by another surface. The cage is rotated by the orbiting rolling members in response to relative rotation of the first race with respect to the second race. A lubricant is generally provided in the space between two races.

The cage has a specific construction comprising wedge-shaped recesses or depressions in the cage surface which abuts the piloting surface, with the deeper end of the recess in the leading direction of rotation of the cage. This leading end of the recess is open, and a fluid such as lubricant and/or air can flow in or by scooped in. During fast rotation of the cage, lubricant and/or air flows in or is scooped into the leading deep end of the recess and is compressed toward the shallow trailing end of the recess against the piloting surface. When the cage is concentric, these forces are in balance around the circumference and are now small because of the space between cage and piloting surface. Any unbalanced force tending to move the cage from its concentric position into forceful contact with the piloting surface is automatically opposed by an increased hydrodynamic force at the decreased space between cage and piloting surface acting in a direction to keep the cage out of such forceful contact.

The invention as well as its many advantages may be further understood by reference to the following detailed description and drawings in which:

FIG. 1 is an elevational view, partly in section, of a preferred embodiment of the invention;

FIG. 2 is a sectional view on an enlarged scale taken generally along lines 2—2 of FIG. 1 and in the direction of the arrows;

FIG. 3 is a perspective view of the cage of FIG. 1;

FIG. 4 is a fragmentary perspective view, on an enlarged scale, of another cage embodying my invention;

In the various figures, like parts are referred to by like numbers.

Figure 5:
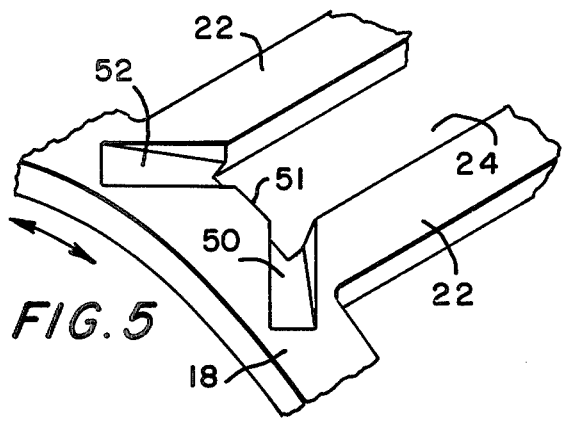
FIG. 5 is a fragmentary perspective view, on an enlarged scale, showing still another preferred cage.

Referring to the drawings and more particularly to FIG. 1, there is shown an embodiment of my invention in the form of a radial anti-friction bearing with a cage guided by the bore wall of an outer race. The bearing includes a first race or outer race 10 and a second race or inner race 12 spaced from the first race to provide an annular space 14 between the races 10 and 12. An annular cage 16 is located in the annular space 14. The cage 16 when concentric is normally spaced from both the outer race 10 and the inner race 12, but is intended to be piloted on the inner surface raceway 15 of the outer race 10 when displaced far enough from its concentric position.

The annular cage 16 has a pair of longitudinally spaced circumferential rims 18 and 20 and a plurality of circumferentially spaced longitudinally extending cage bars 22 (see FIG. 3) extending between the rims 18 and 20. The rims 18 and 20 and the interconnecting bars 22 provide a plurality of circumferentially spaced pockets 24 each of which contains a rolling member such as a roller 26 (see FIG. 1).

Referring to FIG. 3, it can be seen that a plurality of generally circumferentially extending recesses 30 are located on the outer periphery of each of the rims 18 and 20.

As can be seen by referring to FIG. 2 and FIG. 3, the recesses are generally wedge-shaped. Each wedge-shaped recess 30 has a recess floor 32 extending generally circumferentially along the rims and sloping from the outer periphery of the rim at point 31 to its greatest depth at point 34 (see FIG. 2). A front wall 37 extends from the greatest depth of the floor to the rim outer periphery. Sidewall 35 extends along the entire length of the recess. Sidewall 38 extends partially from the shallow end of the recess toward the deep end of the recess thereby providing an opening 39 from the recess 30 to the edge of the cage, at the deep end of the recess (see FIG. 3).

In the operation of the embodiment shown in FIGS. 1 through 3, as the inner race 12 is rotated clockwise in FIG. 2 at a high speed, the retiner also is rotated in a clockwise direction, looking at FIG. 2, at a lesser high speed which is approximately one-half the rotational speed of the inner race 12. The unbalanced retainer tends to ride against the guiding surface 15 on the outer race 10 because of the unbalanced centrifugal or other forces. Hydrodynamic forces are created by the lubricant and/or by air in the bearing being pulled in at the deep leading end of the recess and being wedged at the trailing end of the recess between cage outer periphery and the piloting surface, and these forces act in the radial direction opposite to that of the forces which tend to cause the contact between cage and race. The closer the two surfaces are to contacting, the greater the beneficial counter-acting wedging hydrodynamic force effect. This counter-acting or balancing hydrodynamic force tends to push the surfaces apart and out of contact. At relatively low speed, of course, the hydrodynamic effect is much lower, but so are the centrifugal forces which tend to cause the cage to rub forcefully against its piloting surface on the bearing race. Thus, the balancing force is generated as needed. The metal-to-metal contact between the cage and the piloting surface is greatly reduced or eliminated entirely, thereby greatly reducing friction, and greatly reducing abrasion and heat generation, not only between the cage and the race but also between the rollers and the cage.

With the cage embodiment shown in FIG. 4, the cage may be rotated in either direction and still have the required hydrodynamic result, tending to keep the cage centered in the bearing. Referring to FIG. 4, the cage includes a plurality of pairs of wedge-shaped recesses, each with a recess floor such as 40 or 42 sloping circumferentially in opposed directions along the rim from the outer periphery of the rim and meeting at their greatest depth near the circumferential center of the recess as indicated by numeral 44. A sidewall 46 extends along the entire length of each pair of wedge-shaped recesses. A short sidewall 48 extends partially from the shallow end of each recess thereby providing an opening 49 at the deep ends of the recesses for scooping lubricant or air.

The operation of the bearing with the cage embodiment of FIG. 4 is substantially the same as the operation of the bearing with the cage embodiment of FIGS. 1 through 3 except that with the embodiment of FIG. 4 the cage may be rotated in either direction. Lubricant and/or air enters the opening 49 and is wedged at the shallow ends of the recesses between cage periphery and piloting surface.

The cage of FIG. 5 may also be rotated in either direction. The recesses 50 located on the outer periphery of the rim extend angularly in one direction with respect to the edge 51 formed by the inside radial wall (not shown) and the outside surface of the rim 18 and recesses 52 extend angularly in the opposite direction with respect to edge 51. All of the recesses 50 and 52 are wedge-shaped.

With some very thin wall cages which are much lighter in weight we may bend the thin wall cage into the shape of the hydrodynamic wedge without changing the wall thickness, rather than coining or machining the recesses beneath the surface. If desired, we may also include wedge-shaped recesses totally or partially on the cross-bars. The configuration of the wedge can be varied as regards their position on the cage, their depth and the profile of the shape, and so forth. The configuration should be constructed to take advantage of the lubricant viscosity, the source of and the distribution of the lubricant and air in the bearing, relative speed between cage and guiding surfaces, and so forth.

Figure 6:
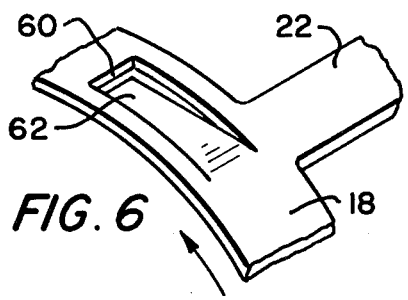
FIG. 6 is a fragmentary perspective view showing still another preferred cage with a lanced tab bent down to form a wedge-shaped recess.

In the embodiment shown in FIG. 6, the recesses 60 comprise a lanced tab 62 which extends circumferentially along the rim 18. The outer surface of the lanced tab slopes from the outer periphery of the rim to a point radially inside the inner periphery of the rim, thus forming the opening at the deep end of the recess 60 for scooping lubricant or air. The cage rotates in one direction.

Figure 7:
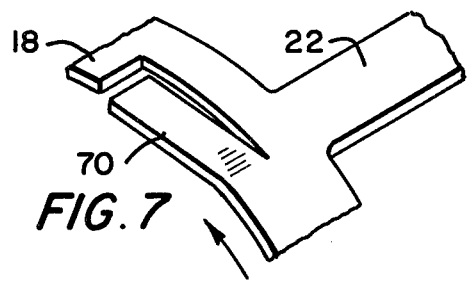
FIG. 7 is a fragmentary view of still another preferred cage with the lanced tab bent down from the axial end of the rim of the cage to form the wedge-shaped recess.

In the embodiment of FIG. 7, the lanced tab 70 is provided along the axial outer edge of the rim 18. The top surface of the lanced tab 70 slopes from the outer periphery of the rim 18 to a point radially inside the inner periphery of the rim to form the opening at the deep end of the recesses for scooping lubricant or air. The cage rotates in one direction.

Figure 8:
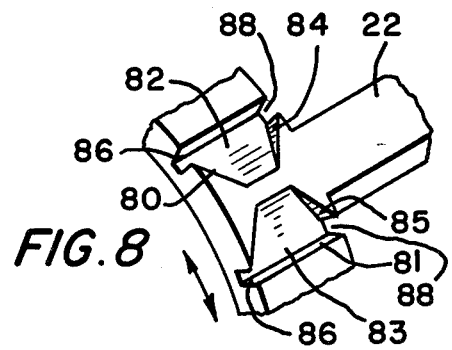
FIG. 8 is a fragmentary perspective view showing wedge-shaped recesses on the outside of the rims with the wedge-shaped recesses having two openings.

In the embodiment of FIG. 8, the circumferentially separated wedge-shaped recesses 80 and 81 include recess floors 82 and 83, respectively. There are a plurality of pairs of recesses 80 and 81 (one pair shown in FIG. 8) on each rim (only one rim shown in FIG. 8). Recess floor 82 slopes in the opposite direction from the slope of recess floor 83. Two sidewalls extend partially from the shallow end of each recess toward the deep end of the recess. One sidewall (not shown) ends at the axial outer end of the rim. The other sidewall, 84 of recess 80 and 85 of recess 81 ends at a pocket. This arrangement provides two openings, one opening 86 at the outer end of the rim, the other opening 88 at a pocket. Openings 86 and 88 scoop up lubricant or air. The cage can be rotated in either direction.

Figure 9:
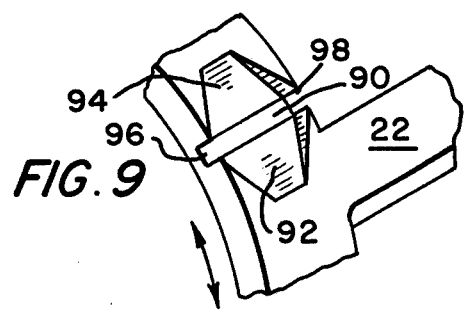
FIG. 9 is a fragmentary perspective view of still another preferred embodiment showing a back-to-back arrangement of wedge-shaped recesses.

In the embodiment of FIG. 9, the wedge-shaped recesses are arranged as a plurality of pairs of wedge-shaped recesses. A surface 90, extending axially entirely across the rim and concentric to the inner and outer peripheries of the rim separates the deep ends of the recess floors 92 and 94. Each sidewall extends from the shallow end of the recess up to surface 90 to provide openings 96 and 98 for scooping lubricant or air. The cage can be rotated in either direction.

Figure 10:
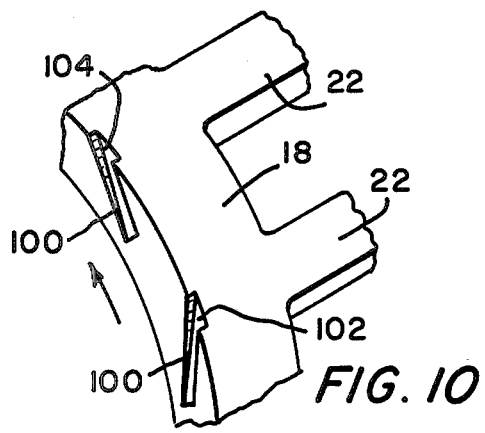
FIG. 10 is a fragmentary perspective view of another preferred embodiment with the wedge-shaped recesses formed on the axial end surface of the rim.
Figure 11:
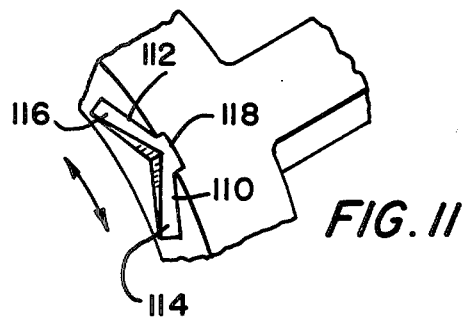
FIG. 11 is a fragmentary perspective view of still another preferred cage including wedge-shaped recesses on the axial end surface of the rims and permits rotation of the cage in either direction.

In the embodiment of FIG. 10, and in the embodiment of FIG. 11, the recesses are located on the axial end surface of each rim. In FIG. 10, each wedge-shaped recess 100 has a bottom surface 102 which extends angularly with respect to the radius of the cage and slopes from the axial end surface of the rim toward the outside periphery of the rim. The slope is such that the deep end of the recess 100 forms openings 104 for scooping lubricant or air. The cage rotates in one direction.

In FIG. 11, the recesses 110 and 112 are back-to-back with their bottom surfaces 114 and 116, respectively, extending angularly in different directions with respect to the radius of the cage. The deep ends of the recesses 110 and 112 meet at the opening 118 on the outer periphery of the rim. As with the other embodiments, the opening 118 scopes up lubricant or air. The cage can rotate in either direction.

The use of hydrodynamic forces to keep the cage out of forceful contact with the race may also be used on thrust bearings as well as on radial bearings.

Figure 12:
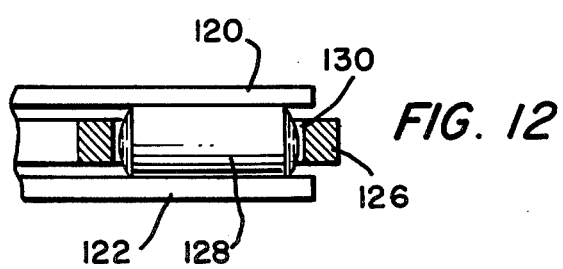
FIG. 12 is a sectional elevational view of a portion of a thrust bearing.

FIG. 12 shows somewhat schematically a thrust bearing including a pair of axially separated thrust plates 120 and 122 with an annular cage 126 placed between the two thrust plates. Rollings members, such as rollers 128 are located in pockets 130 of the cage 126.

Figure 13:
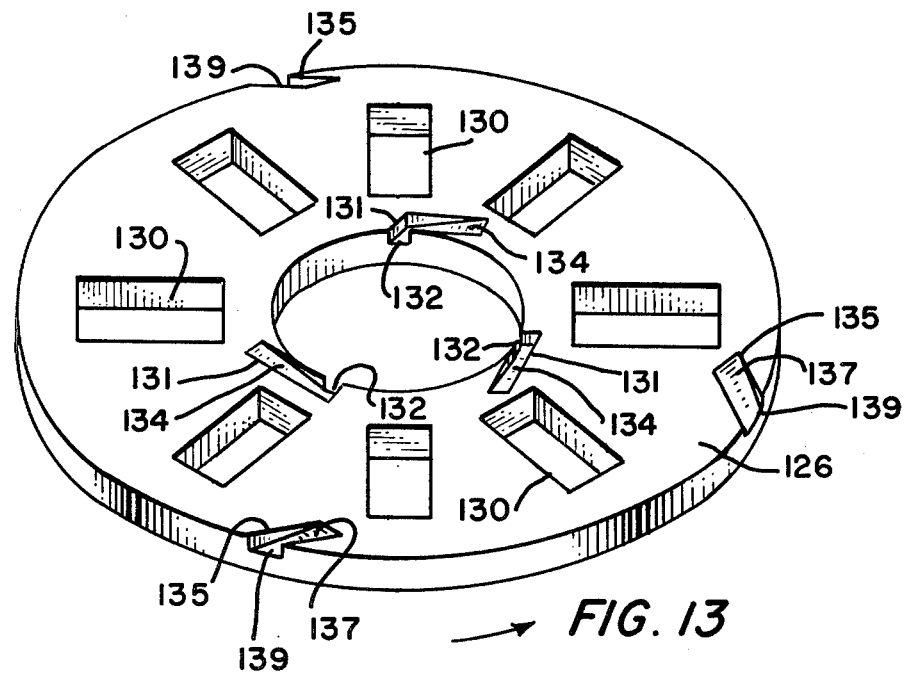
FIG. 13 is a perspective view of a thrust bearing cage including the wedge-shaped recesses.

FIG. 13 shows a thrust bearing cage with our new wedge-shaped recesses included. The wedge-shaped recesses 131 have openings 132 which lead into the central bore of the thrust bearing cage 126. The bottom surface 134 of each recess 131 extends angularly with respect to the radius of the cage 126 in the same direction. The bottom surface 134 slopes downwardly from the outer surface of the thrust bearing cage 126 to the deep end of the recesses. Wedge-shaped recesses 135 may also be provided on the outer periphery of thrust bearing cage 126. The bottom surface 137 of each recess 135 slopes from the surface of the cage 126 to the outer periphery of the cage thus providing scoop hole 139.

Figure 14:
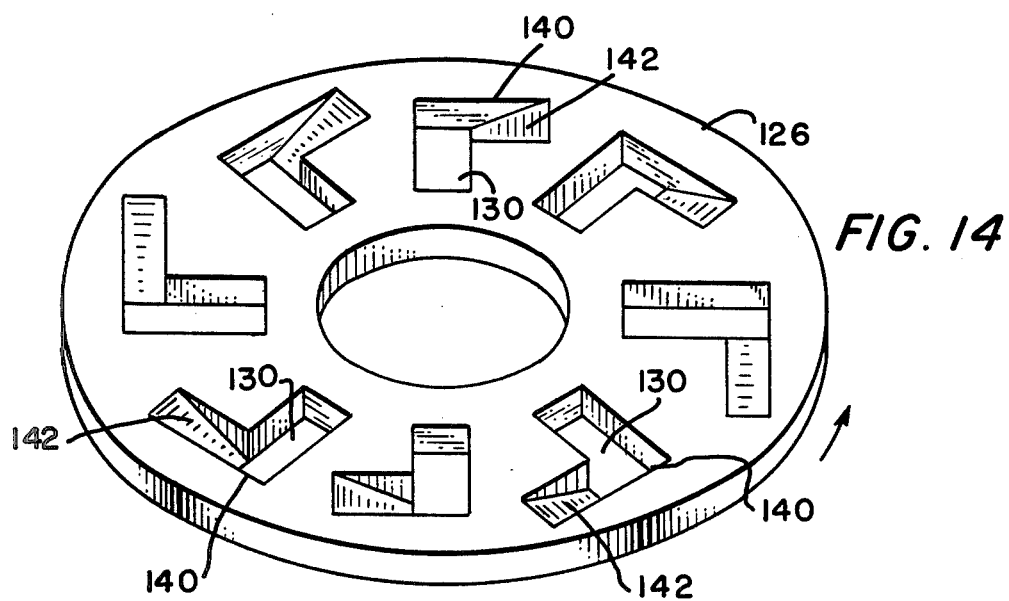
FIG. 14 is a perspective view of still another preferred thrust bearing cage with wedge-shaped recesses.

FIG. 14 shows another preferred embodiment of a thrust bearing cage. The wedge-shaped recesses 140 have openings at their deep ends which lead into a roller bearing pocket 130. The bottom surface 142 of each recess 140 slopes from the outer surface of the cage 126 with the deep end being at the pocket 130.

I claim:

1. A bearing comprising: a first race; a second race spaced from the first race; a cage located in the space between said races and normally spaced from both the first race and the second race, said cage having a plurality of circumferentially spaced rolling member pockets; rolling members located in said pockets, said cage being rotated by the rolling members in response to relative rotation of the first race with respect to the second race; fluid in the space between said two races; said cage having a plurality of generally wedged-shaped recesses, each recess having at least one opening at its deep end, the opening at said deep end being located so that during cage rotation in a particular direction, fluid is scooped into the recess and wedged at the shallow end of its recess between the cage wall and a cage piloting surface so that during rotation of the cage, any force tending to move the cage from said normally spaced position into contact with said cage piloting surface is automatically opposed by a hydrodynamic force acting to keep the cage out of such contact.

2. A bearing in accordance with claim 1 wherein: the cage has a pair of longitudinally spaced rims and a plurality of circumferentially spaced bars providing circumferentially spaced rollings member pockets and the recesses are located on each rim.

3. A bearing in accordance with claim 2 wherein the recesses are located on the outer axial end of each rim.

4. A bearing in accordance with claim 2 wherein the recess comprises a lanced tab extending circumferentially along the rim and sloping from the outer periphery of the rim to a point radially inside the inner periphery of the rim thus forming the opening at the deep end of the recess for scooping fluid.

5. A bearing in accordance with claim 4 wherein the lanced tabs are along the outer ends of the rims.

6. A bearing in accordance with claim 4 wherein the lanced tabs are substantially centrally axially along the rims.

7. A bearing in accordance with claim 2 wherein the recesses are located on the outer periphery of each rim.

8. A bearing in accordance with claim 7 wherein each recess is formed by a recess floor extending circumferentially along the rim and sloping from the outer periphery of the rim to the deep end of the recess, a front wall extending from the deep end of the recess to the outer periphery of the rim, a side wall extending along the entire length of the recess, and a short side wall extending partially from the shallow end of the recess toward the deep end of the recess thereby providing the opening at the deep end of the recess for scooping fluid.

9. A bearing in accordance with claim 7 wherein there are a plurality of pair of wedge-shaped recesses arranged back-to-back and formed by a first recess floor extending circumferentially along the rim and sloping from the outer periphery of the rim to the deep end of the recess, a second recess floor extending circumferentially along the rim and sloping from the outer periphery of the rim to the deep end of the recess, recess floors meeting at the deep end, a side wall extending along the entire length of each pair of wedge-shaped recesses, and a short side wall extending partially from the shallow end of each recess thereby providing the opening at the deep ends of the recesses for scoping fluid.

10. A bearing in accordance with claim 7 wherein there are a plurality of pairs of wedge-shaped recesses with one of the recesses in each pair extending angularly on the rim in one direction and the other recess in each pair extending angularly on the rim in the opposite direction with the opening at the deep end of all the recesses leading into a rolling member pocket.

11. A bearing in accordance with claim 7 wherein each recess is formed by a recess floor extending circumferentially along the rim and sloping from the outer periphery of the rim to the deep end of the recess, and two side walls each extending partially from the shallow end of the recess toward the deep end of the recess, one of the side walls ending at the outer end of the rim, the other side wall ending at a pocket, thus providing two openings at the deep end of the recess for scooping fluid.

12. A bearing in accordance with claim 7 wherein there are a plurality of pair of wedge-shaped recesses, each recess being formed by a floor extending circumferentially along the rim and sloping from the outer periphery of the rim to the deep end of the recess, a surface extends axially across the rim and is concentric to the inner and outer peripheries of the rim and each sidewall extends from the shallow end of the recess up to said surface thus providing two openings for scooping fluid.

13. A bearing in accordance with claim 1 wherein the cage is a thrust bearing cage and the recess opening leads into the central bore of the thrust bearing cage.

14. A bearing in accordance with claim 1 wherein the cage is a thrust bearing cage and each recess opening leads into a rolling member pocket.

15. A bearing in accordance with claim 1 wherein the cage is a thrust bearing cage and each recess opening is at the outer periphery of the cage.

* * * * *